United States Patent
Feng et al.

(10) Patent No.: US 8,676,497 B2
(45) Date of Patent: Mar. 18, 2014

(54) METHOD AND APPARATUS TO SEARCH AND PROCESS POI INFORMATION

(75) Inventors: Kyte Feng, Los Angeles, CA (US); Bharathi Peddi, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 864 days.

(21) Appl. No.: 12/506,896

(22) Filed: Jul. 21, 2009

(65) Prior Publication Data
US 2011/0022299 A1    Jan. 27, 2011

(51) Int. Cl.
*G01C 21/00* (2006.01)

(52) U.S. Cl.
USPC .................................. 701/426; 707/E17.014

(58) Field of Classification Search
USPC ........... 701/533, 437, 532, 426, 516, 201, 45, 701/117, 438; 455/456.3; 340/995.1
See application file for complete search history.

(56) References Cited

U.S. PATENT DOCUMENTS

| | | | |
|---|---|---|---|
| 6,336,073 B1 | 1/2002 | Ihara et al. | |
| 6,529,143 B2 * | 3/2003 | Mikkola et al. ............ | 340/995.1 |
| 6,643,581 B2 * | 11/2003 | Ooishi .......................... | 701/516 |
| 6,677,894 B2 | 1/2004 | Sheynblat et al. | |
| 6,687,608 B2 | 2/2004 | Sugimoto et al. | |
| 7,239,963 B2 * | 7/2007 | Suzuki ......................... | 701/438 |
| 7,321,826 B2 * | 1/2008 | Sheha et al. .................. | 701/426 |
| 7,715,981 B2 * | 5/2010 | Bradley et al. ............... | 701/426 |
| 7,957,895 B2 * | 6/2011 | Haase ........................... | 701/426 |
| 8,200,246 B2 * | 6/2012 | Khosravy et al. ........... | 455/456.3 |
| 2004/0198396 A1 | 10/2004 | Fransioli | |
| 2005/0021665 A1 | 1/2005 | Sekimoto et al. | |
| 2005/0165543 A1 * | 7/2005 | Yokota .......................... | 701/204 |
| 2005/0170850 A1 | 8/2005 | Edwards et al. | |
| 2006/0287810 A1 | 12/2006 | Sadri et al. | |
| 2007/0162220 A1 * | 7/2007 | Fiedler .......................... | 701/201 |
| 2008/0071749 A1 * | 3/2008 | Schloter ........................ | 707/3 |
| 2008/0091796 A1 | 4/2008 | Story et al. | |
| 2008/0242280 A1 | 10/2008 | Shapiro et al. | |
| 2010/0082241 A1 * | 4/2010 | Trivedi ......................... | 701/208 |
| 2010/0114476 A1 * | 5/2010 | Hsu .............................. | 701/201 |
| 2010/0138151 A1 * | 6/2010 | Jang et al. .................... | 701/201 |
| 2010/0168994 A1 * | 7/2010 | Bourque et al. ............. | 701/200 |

FOREIGN PATENT DOCUMENTS

| | | |
|---|---|---|
| JP | 2003-060771 | 2/2003 |
| JP | 2005-079839 | 3/2005 |
| WO | WO 2004/111880 | 12/2004 |

* cited by examiner

*Primary Examiner* — Thomas Black
*Assistant Examiner* — Robert Payne
(74) *Attorney, Agent, or Firm* — Muramatsu & Associates (57) ABSTRACT

An apparatus and method searches and provides additional Points-of-interest (POI) information to a user when basic POI information such as POI name, address, phone number, etc. is specified. In one aspect, the system includes an information managing unit to search, display and transmit POI information, a communication interface and a plurality of information providers adapted to stream information to the communication interface, and a communication network adapted to connect the information managing unit and the communication interface. The basic information and an additional POI information search request can be transmitted from the information managing unit to the communication interface to search for the additional POI information in the information providers and transmit the additional POI information back to the information managing unit. The additional POI information may be filtered and organized before presenting to the user.

13 Claims, 12 Drawing Sheets

| | Output to device | Facebook (4321') | Yelp (4322') | Zagat (4323') |
|---|---|---|---|---|
| Price (441) | $$$ | $$$ | $$$ | ~~$$$$~~ (Eliminate) |
| Category (442) | Japan | Japan | ~~American~~ (Eliminate) | Japan |
| Open? (443) | Yes | Yes | Yes | Yes |
| Credit Cards? (444) | Yes | ~~No~~ (Eliminate) | Yes | Yes |
| Parking (445) | Street | Street | Parking lot (Eliminate) | Street |
| Reservations? (446) | Suggested | Suggested | Suggested | ~~No~~ (Eliminate) |
| Ratings (447) | 4 stars<br>3 stars<br>3 stars | 4 stars | 3 stars | 3 stars |
| Pictures (448) | Picture 1<br>Picture 2<br>Picture 3 | picture 1 | picture 2 | picture 3 |
| | | | | Take all |
| Friends' Recommendation (449) | Restaurant X<br>Restaurant Y<br>Restaurant Z | Restaurant X | Restaurant Y | Restaurant Z |
| | | | | Take all |

METHOD AND APPARATUS TO SEARCH AND PROCESS POI INFORMATION

FIELD OF THE INVENTION

This invention relates to an information delivery system and method. More specifically, this invention relates to an apparatus and method adapted to filter and organize Points-of-Interest (POI) information provided by a plurality of databases before the POI information is displayed on the apparatus.

BACKGROUND OF THE INVENTION

With remarkable advances in computer, telecommunication and network technologies, information delivery or content delivery service has been proliferating and advancing to deliver not only traditional radio and television signals, but also audio, video or other multimedia contents. The contents can be delivered via cable, satellite, optical fibers, wireless communication networks, or the like. Meanwhile, the contents can be transmitted among various terminals such as personal computers, media players, cellular phones, televisions, personal digital assists (PDAs) or other electronic devices while using different protocols. For example, a user may use the personal computer to transmit traffic information to his or her friend's cellular phone via wireless communication networks, including the Internet.

In addition to vehicle navigation systems, more and more electronic devices, including cell phones, have been equipped with location determining means, such as a global positioning system (GPS), to determine the user's current location and provide the user with dynamic point-of-interest (POI) information. However, the POI information stored in a database of a device may not be updated frequently, and the user may feel frustrated, for example, when the user drives to a restaurant suggested by the device and found that the restaurant has been out of business. Moreover, the POI information in the device is rather limited which may only include POI name, address and telephone number. The user may want to know more about the POI to determine whether this POI is worth going. For example, when the user searches for restaurants to have dinner in his navigation device, the user may want to know each restaurant's menu, recommended dishes, opening hour, rating, etc., in addition to basic POI name, address and phone number. A need exists for users to receive more information about POIs to make an intelligent decision before actually going.

Figure 1:
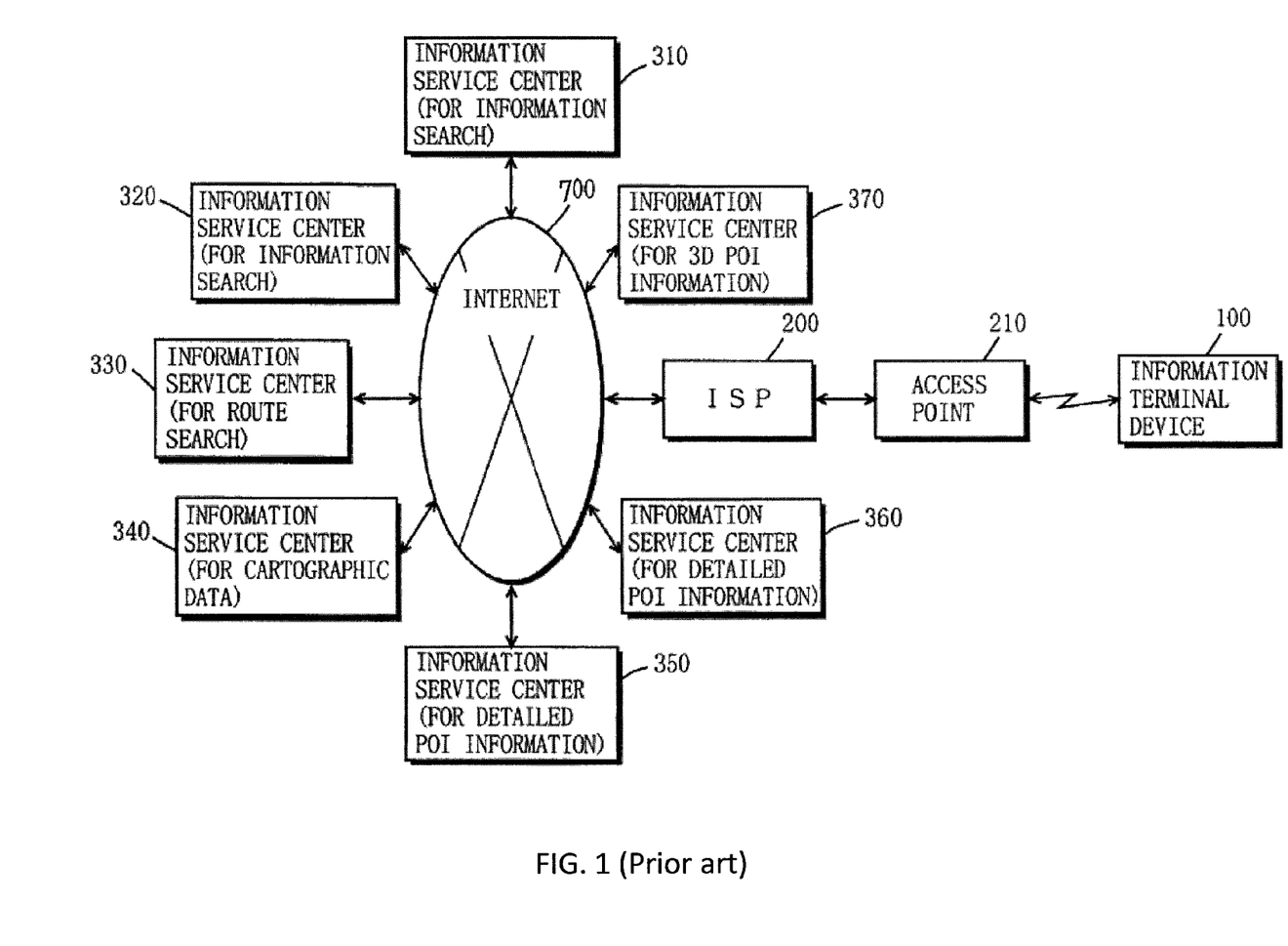
FIG. 1 illustrates a prior art, related to an information terminal device capable of receiving and displaying POI information from information servers, and providing the user further information of a route, distance and traffic information to the POI or POIs.

U.S. Pat. No. 6,336,073 to Ihara et al. discloses an information terminal device capable of receiving and displaying POI information from information servers, and providing the user with further information of a route, distance and traffic condition to the POI or POIs, as can be seen in FIG. 1. Furthermore, the information terminal device is configured to communicate with every information provider on the communication network without restraint as long as the information is provided in the tag format. However, Ihara does not teach anything related to an idea of receiving POI information from different information providers and generating filtered and organized POI information to the user if inconsistent POI information (from different information providers) exists.

Figure 2:
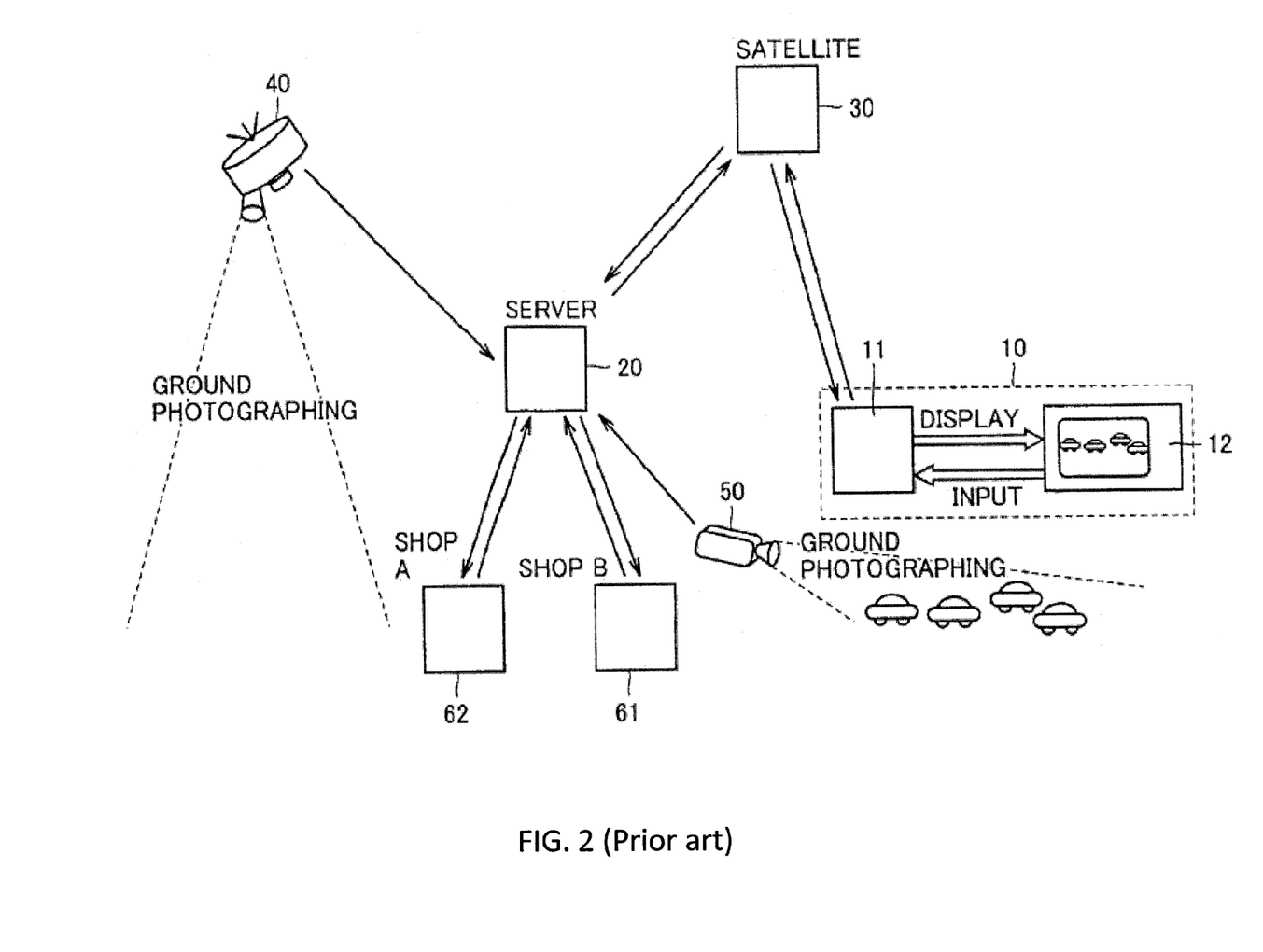
FIG. 2 illustrates a prior art, related to a navigation system to provide real-time information from a server to the user. Furthermore, the navigation system transmits the user's positional information to the server, which transmits real-time information on areas in the traveling direction of the user to the user's navigation system.

U.S. Pat. No. 6,643,581 to Ooishi discloses a navigation system designed to provide real-time information from a server to the user. More specifically, the navigation system transmits the user's positional information to the server, which transmits real-time information on areas in the traveling direction of the user to the user's navigation system, as illustrated in FIG. 2. The real-time information may include a congested state of a restaurant and allow the user to make a reservation at the restaurant through a communication network. However, Ooishi does not disclose how to filter and organize the real-time information before presenting to the user.

Figure 3:
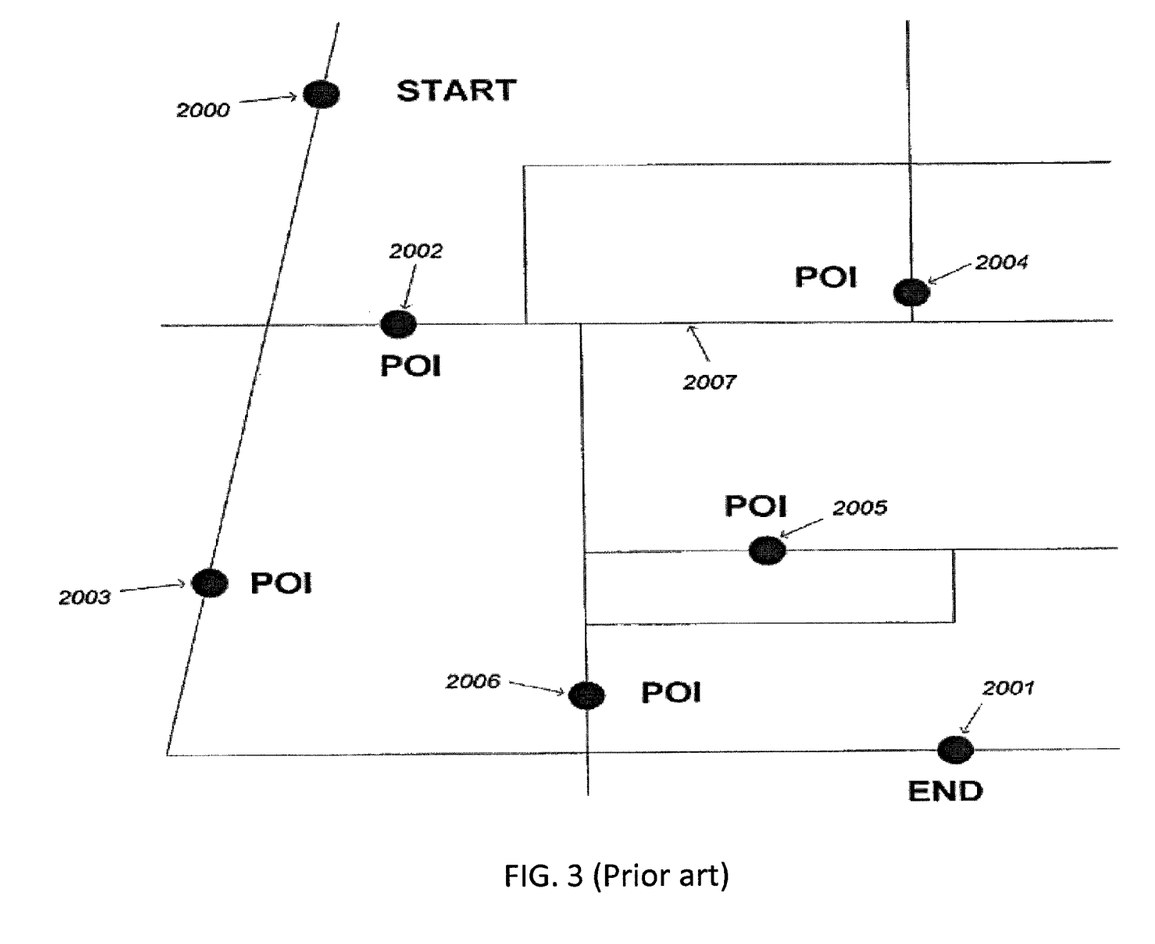
FIG. 3 illustrates a prior art, related to a method and system for searching and retrieving location information associated with one or more POIs. More specifically, the system is configured to search various POIs within a given search zone, such as a radial search or a zip code or city search, based on position information from a navigational device.

U.S. Pat. No. 7,321,826 to Sheha discloses a method and system for searching and retrieving location information associated with one or more POIs, as can be seen in FIG. 3. More specifically, the system is configured to search various POIs within a given search zone, such as a radial search or a zip code or city search, based on position information from a navigational device. A plurality of search criteria will be applied and the criteria can be dependent upon the location of a POI with respect to the real-time position of the user, and any preferences or search restrictions selected by the user, such as rating information about the POI. Like Ihara and Ooishi, Sheha does not teach anything related to receiving POI information from different information providers and generating filtered and organized POI information to the user if inconsistent POI information (from different information providers) exists.

Therefore, there remains a need for a new and improved apparatus and method to deliver content or information to the user. More specifically, the apparatus and method is adapted to provide content or information from a plurality of databases, and further filter and organize such content or information before presenting to the user.

SUMMARY OF THE INVENTION

It is an object of the present invention to provide a method and system for searching and retrieving additional POI information from at least one communication interface, including the Internet. For example, the system is configured to search and retrieve additional information of a restaurant including the restaurant's menu, recommended dishes, opening hour, rating, etc., and provide such information to a user to make an intelligent decision as to whether to go to the restaurant.

It is another object of the present invention to provide a method and system for searching and retrieving additional POI information from a plurality of databases when basic POI information, such as POI name, address, telephone number, is provided.

It is still another object of the present invention to provide a content delivery system and method to deliver additional POI information to the user when the user inputs at least a portion of the basic POI information such as name, address, phone number, etc. to the system, and more information about the POI can be transmitted to the user from the communication interface, including the Internet.

Since the additional POI information is retrieved from a plurality of information providers, at least a portion of the additional information may be inconsistent with other information. It is a further object of the present invention to generate filtered and organized POI information in which the POI information retrieved from a plurality of information providers is further analyzed before presenting to the user.

According to one aspect of the present invention, an information communication system may include an information managing unit adapted to transmit, receive, process and display POI information; a communication network to connect the information managing unit to at least one communication interface, including a remote server, the Internet and the like; and a plurality of information providers configured to stream additional POI information to the communication interface, and such information may be transmitted to the information managing unit via the communication network.

In one embodiment, the user inputs at least a POI name into the information managing unit to retrieve more basic information of the POI, including the POI's address, phone number, etc. The user can further transmit such information from the information managing unit to at least one communication interface via the communication network to search for additional POI information. The basic information can be transmitted wirelessly via WiFi, Bluetooth, or the like. According to the basic information provided, the communication interface, for example, the Internet, is configured to retrieve the additional POI information by searching a plurality of websites, such as Google, Yahoo, Yellow Pages, etc. More specifically, if the user is searching for additional information about a restaurant, some websites such as Yelp, Zagat, and social networking websites like Facebook, My Space, etc. can also be searched. Additional information about the restaurant, such as rating, recommended dishes, opening hours, pictures, etc. will be transmitted back to the information managing unit through the communication network.

In another embodiment, the communication interface can be a remote server in which the detailed POI information may be streamed from at least one information provider, i.e. a server subscriber, to the remote server which is capable of retrieving related detailed POI information from at least one information provider and transmitting to the user through the communication network.

Since the additional POI information is retrieved from a plurality of information providers, at least a portion of the additional information may be inconsistent with other information. In a further embodiment, the additional POI information can be further filtered and organized by the information managing unit before presenting to the user. More specifically, the information processing unit compares the additional POI information provided by each information provider and eliminates at least a portion of the additional POI information provided by at least one information provider if the portion of additional POI information is inconsistent with the same portion of the additional POI information provided by a majority of the information providers.

In still a further embodiment, the additional information POI information includes recommendation of other similar POIs. The recommended POIs can be prioritized according to the user's current location.

In another aspect, a method for searching POIs and receiving additional POI information includes the steps of: inputting at least a portion of basic POI information on an information managing unit, the basic POI information includes a POI name, a POI address and a POI phone number; transmitting at least the portion of the basic POI information to a communication interface via a communication network; searching and retrieving additional information of the POI from the communication interface; transmitting the additional information of the POI from the communication interface to the information managing unit via the communication network; and displaying the basic and additional information of the POI.

In one embodiment, the step of inputting at least a POI name on an information managing unit to retrieve a portion of information of the POI includes a step of inputting the POI name through an information inputting unit and an input device interface, and retrieving the portion of POI information from a POI database of the information managing unit. The step of transmitting the portion of information of the POI to a communication interface via a communication network includes a step of wirelessly (WiFi, Bluetooth or the like) transmitting the portion of information of the POI to the communication network. Furthermore, the communication interface may include a remote server, the Internet or the like.

As mentioned above, since the additional information of the POI is retrieved from a plurality of information providers, at least a portion of the additional information may be inconsistent and the information processing unit is configured to filter and organize the additional POI information before presenting to the user. In one embodiment, if there is no inconsistent information, the additional POI information will be displayed to the user. However, if there is inconsistent information, the step of displaying the additional information of the POI may include a step of filtering and eliminating inconsistent information retrieved from different information providers. The step of filtering and eliminating inconsistent information may further include a step of filtering and eliminating at least a portion of the additional information provided by at least one information provider if the portion of the additional information is inconsistent with the same portion of the additional information provided by a majority of the information providers.

The present invention together with the above and other advantages may best be understood from the following detailed description of the embodiments of the invention illustrated in the drawings below.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to an information delivery system and method. More specifically, this invention relates to an apparatus and method adapted to filter and organize Points-of-interest (POI) information retrieved from a plurality of databases before presenting to a user. As mentioned above, some modern electronic devices today are capable of searching for POIs and providing POI information to the user. However, the information may be limited to some basic POI information such as POI name, address, phone number, etc., and the user may want to know more about the POI. As illustrated in FIG. 4b, for example, when the user searches for a restaurant for dinner, the user may want to know more information about the restaurant such as rating, recommended dishes, customer reviews, parking availability, etc., so that the user can have a better understanding of the restaurant before actually going.

Figure 4:
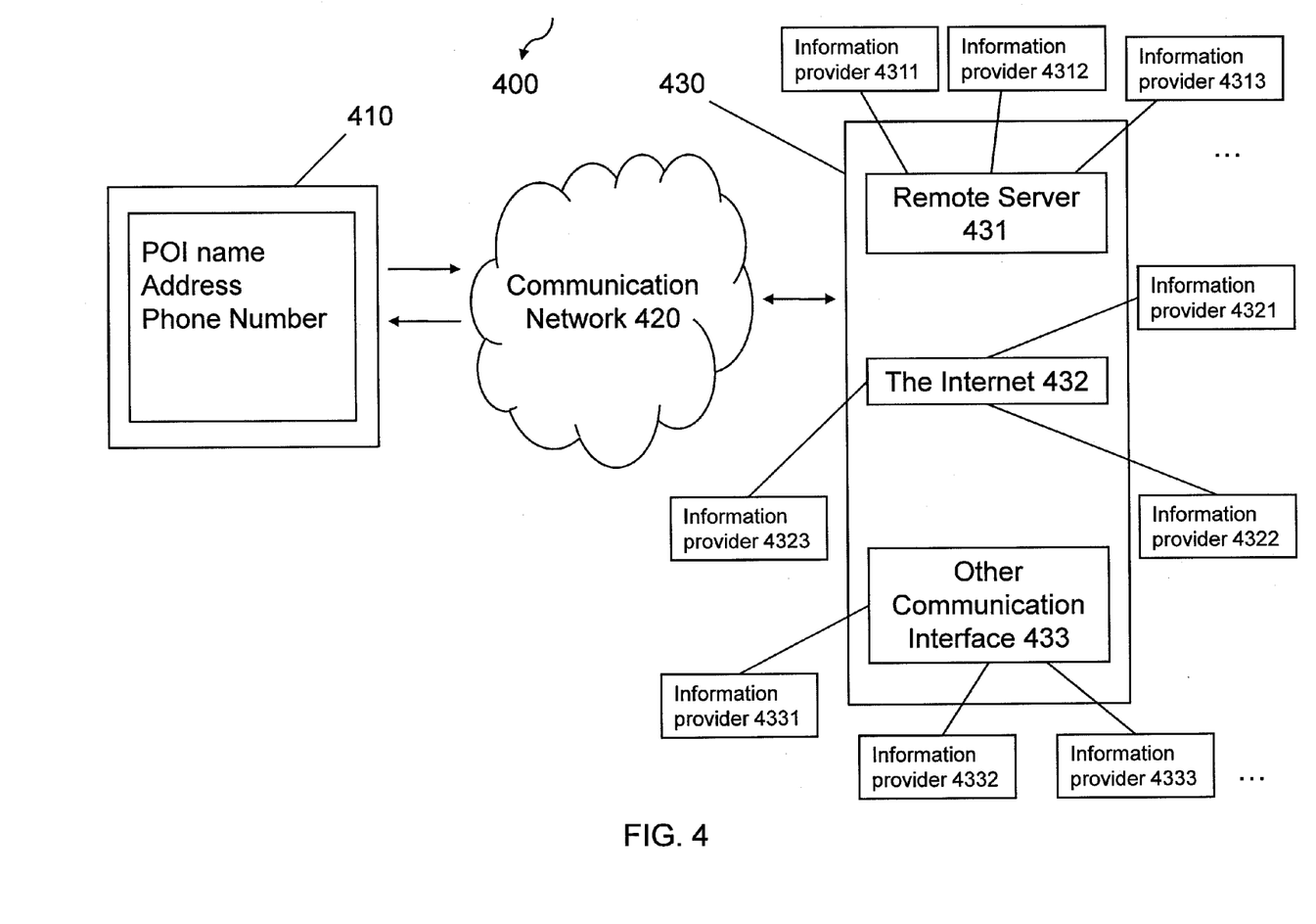
FIG. 4 illustrates a communication system disclosed in the present invention, which includes an information managing unit, a communication network, a communication interface and a plurality of information providers.
Figure 4A:
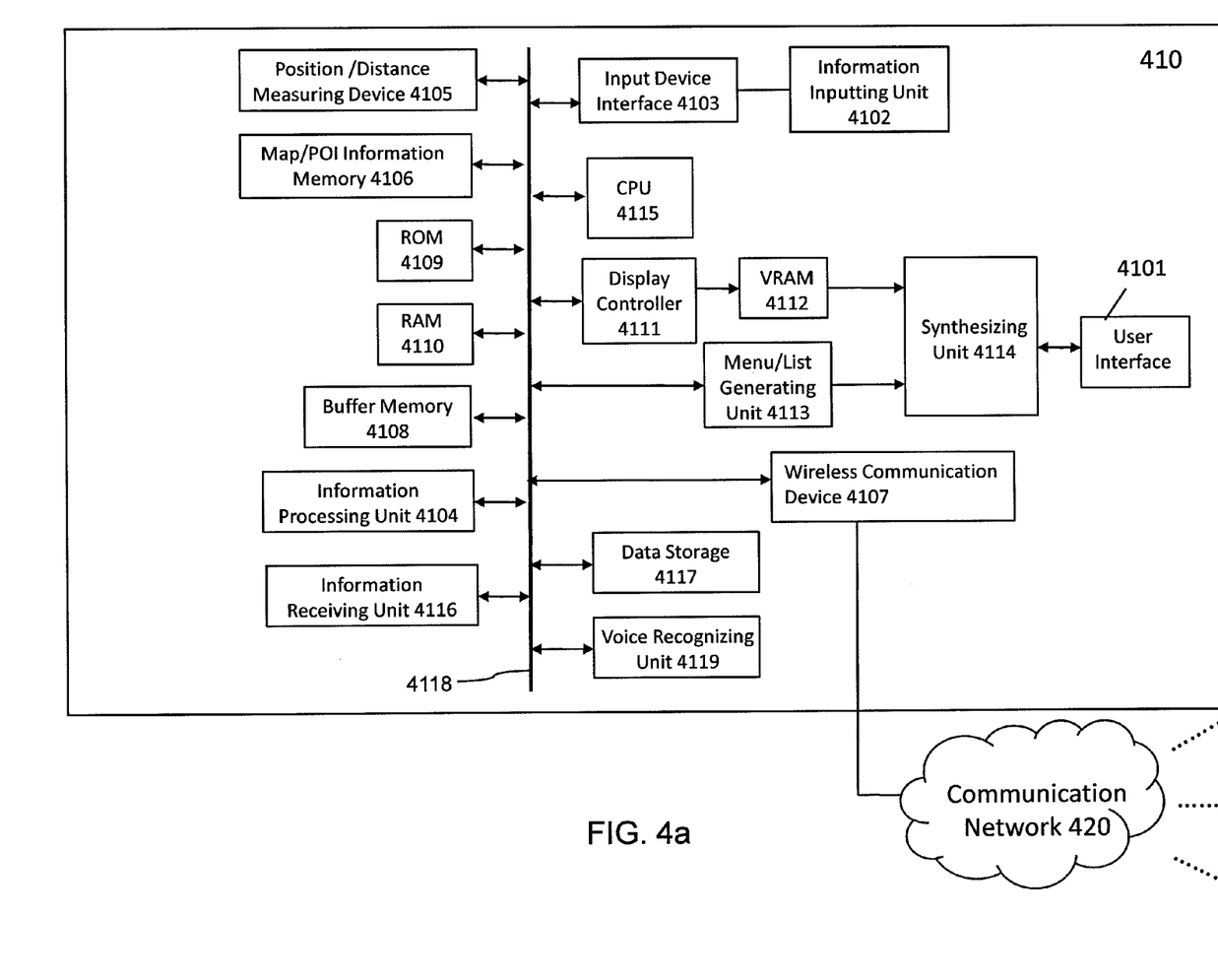
FIG. 4a illustrates a functional block diagram showing an example of structure of an information managing unit in the information communication system to provide filtered and organized POI information to the user.
Figure 4B:
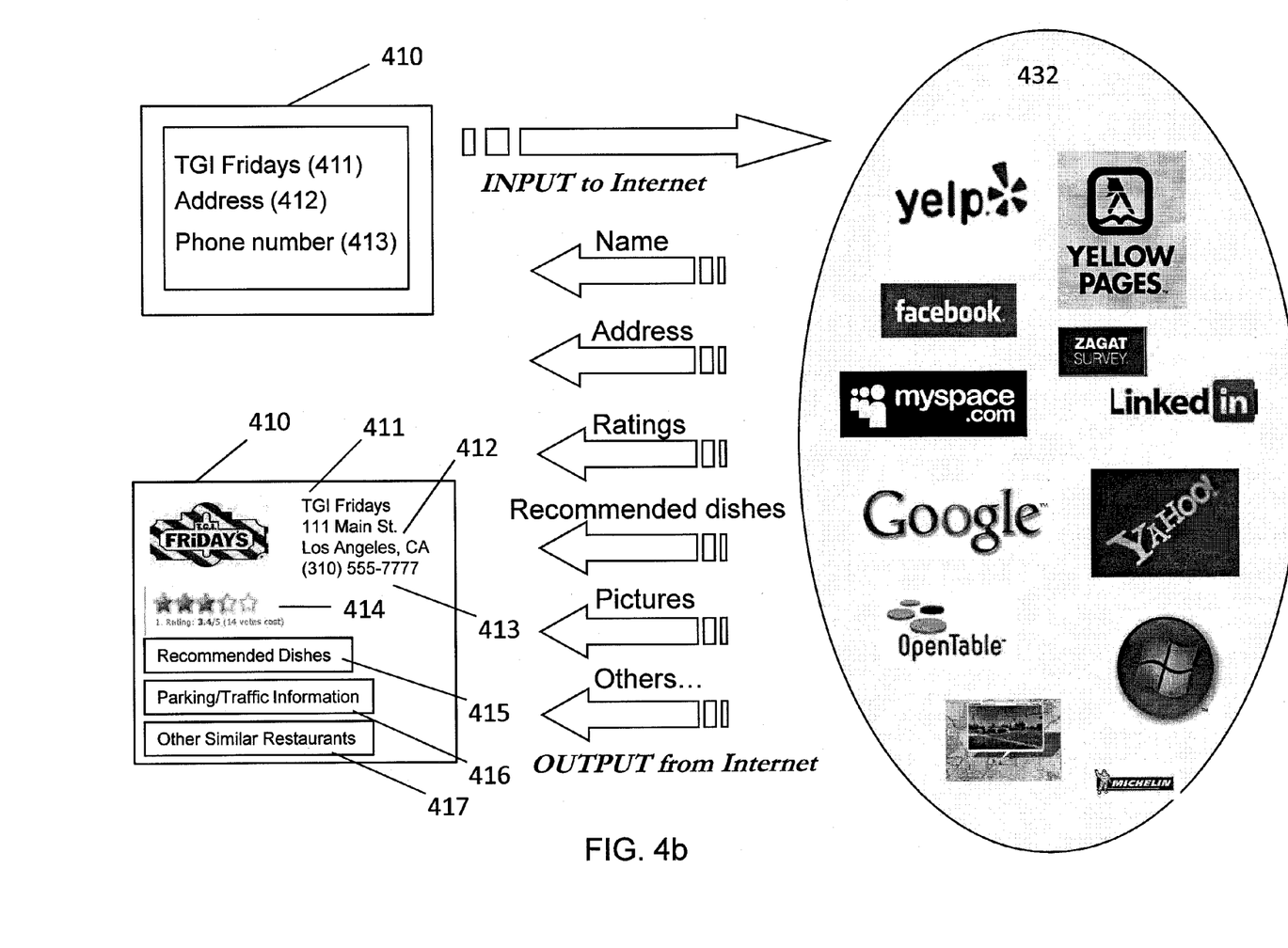
FIG. 4b illustrates one embodiment in the present invention in which the information managing unit transmits basic POI information to the communication interface which is programmed to search and retrieve additional POI information according to the basic POI information.
Figure 4C:
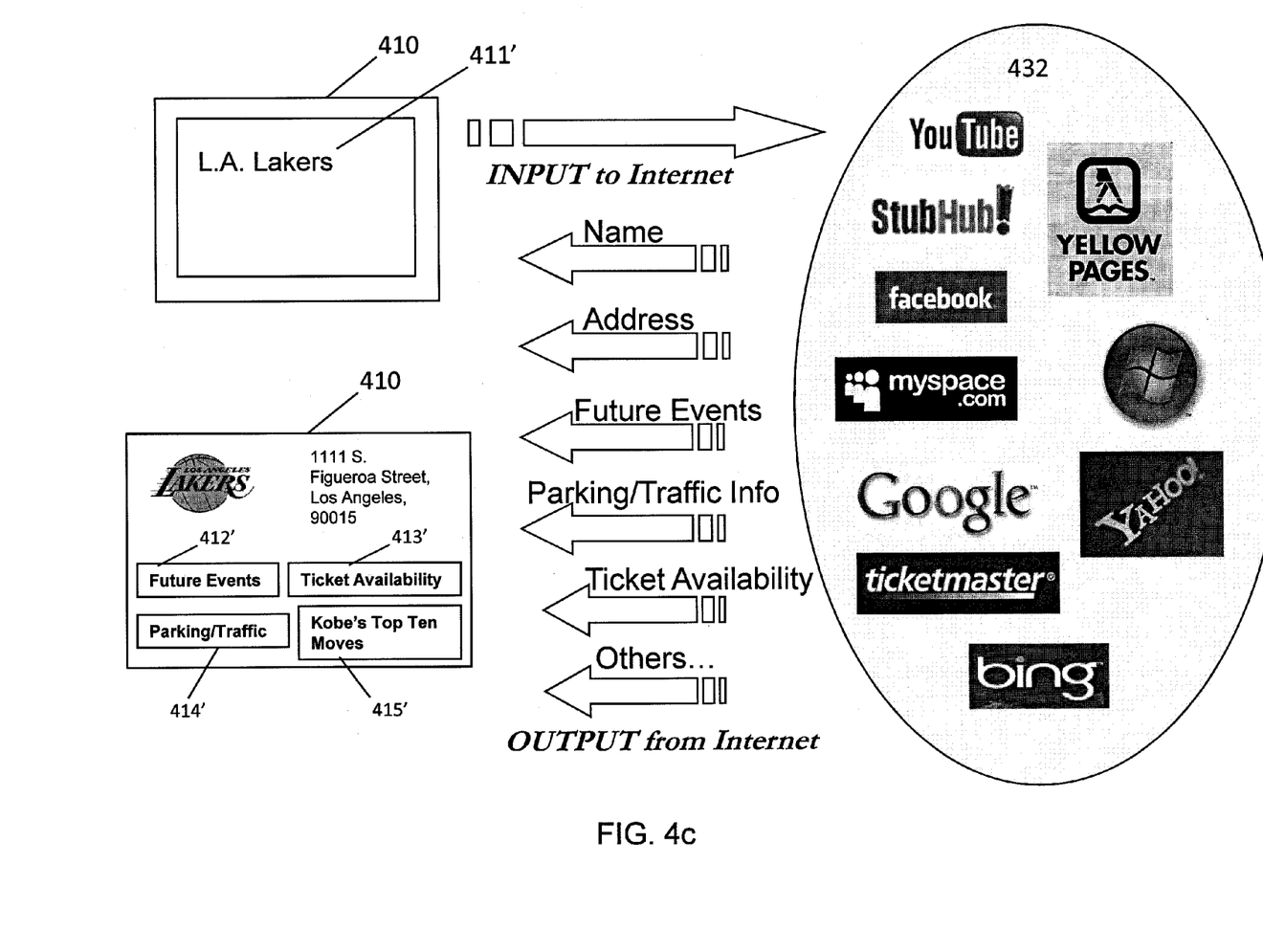
FIG. 4c illustrates another embodiment in the present invention in which the information managing unit transmits basic POI information to the communication interface which is programmed to search and retrieve additional POI information according to the basic POI information.

Another example can be seen in FIG. 4c, when the user searches for a sport event, for example, the Lakers basketball game, more information may be provided to the user according to the present invention, such as ticket availability, parking or traffic information, future events in Staple Center, etc. With these information, the user may design his or her schedule around the events or at least the user can avoid traffic while going to the event.

In one aspect according to FIG. 4, an information communication system 400 may include an information managing unit 410 adapted to transmit, receive, process and display POI information; a communication interface 430 including a remote server 431, the Internet 432, and other communication interface 433, where a POI search request from the information managing unit 410 is processed; a communication network 420 to connect the information managing unit 410 and the communication interface 430; and a plurality of information providers (4311-4313, 4321-4323, 4331-4333, etc.) configured to stream related POI information to the communication interface 430 after receiving the POI search request.

In one embodiment, the basic POI information can be transmitted from the information managing unit 410 to the communication network 420 wirelessly via WiFi, Bluetooth, etc. The information managing unit 410 can be an electronic device such as a PDA, a cell phone, a navigation device, etc., which is capable of retrieving the basic POI information from at least one database inside the electronic device and transmitting such information and the POI search request to the communication interface 430 to search for additional POI information according to the basic POI information.

The communication interface 430 may include the remote server 431, the Internet 432, and other communication interface 433, which is configured to search the additional POI information as requested. The additional POI information may be provided by a plurality of information providers 4311-4313, 4321-4323, 4331-4333, etc., which are adapted to stream the additional POI information to the communication interface 430. In one embodiment, the information providers 4311, 4312, 4313, connected to the remote server 431, can be databases storing POI reviews provided by server subscribers. In another embodiment, the information providers 4321, 4322, 4323, connected to the Internet 432, can be website databases which include the additional POI information. The additional POI information can then be transmitted back to the information managing unit 410 from the communication interface 430 via the communication network 420.

FIG. 4a is a block diagram illustrating an example of structure of the information managing unit 410 for implementing the present invention. As can be seen in FIG. 4a, the information managing unit 410 comprises a user interface 4101; an information inputting unit 4102 communicatively coupled with an input device interface 4103 to receive basic POI information inputted by the user. The information managing unit 410 also includes a Map/POI information memory 4106 for storing the map and POI information which is read from a data storage 4117, and a wireless communication device 4107 to communicatively couple with the communication network 420 to transmit and receive information between the information managing unit 410 and the communication interface 430. More specifically, the wireless communication device 4107 can transmit the basic POI information and the search request to the communication interface 430, and receive the additional POI information (by coupling with an information receiving unit 4116) from the communication interface 430. The information receiving unit 4116 is programmed to communicatively couple with an information processing unit 4104, where the additional POI information may be further processed before presented to the user on the user interface 4101.

The information managing unit 410 may also include a position and distance measuring device 4105 to detect the current position of the user and determine a distance between the user's current position and a destination. The position and distance measuring device 4105 has a speed sensor for detecting a moving distance, a gyroscope for detecting a moving direction, a microprocessor for calculating a position, a GPS (global positioning system) receiver for receiving GPS signals from satellites for calculating a current position of the user. In one embodiment, the position and distance measuring device 4105 provides information of the user's current position to the information processing unit 4104, and if the additional POI information includes recommendation of other similar POIs, the information processing unit 4104 may prioritize the similar POIs according to the user's current location.

Still referring to FIG. 4*a*, the information managing unit 410 includes a bus 4118 for interfacing the above units in the terminal, a processor (CPU) 4115 for controlling an overall operation of the information managing unit 410, a ROM 4109 for storing various control programs, a RAM 4110 for storing a processing result such as the additional POI information, a display controller 4111 for generating image, if any, on the basis of the event information, a VRAM 4112 for storing images generated by the display controller 4111, a menu/list generating unit 4113 for generating menu image/various list images, a synthesizing unit 4114, and a buffer memory 4108 for temporary storing data for ease of data processing. In one embodiment, the information managing unit 410 may include a voice recognizing unit 4119 which is communicatively coupled with the input device interface 4103 and programmed to recognize the user's spoken command, such that the basic POI information can be inputted by the user's voice.

Figure 6:
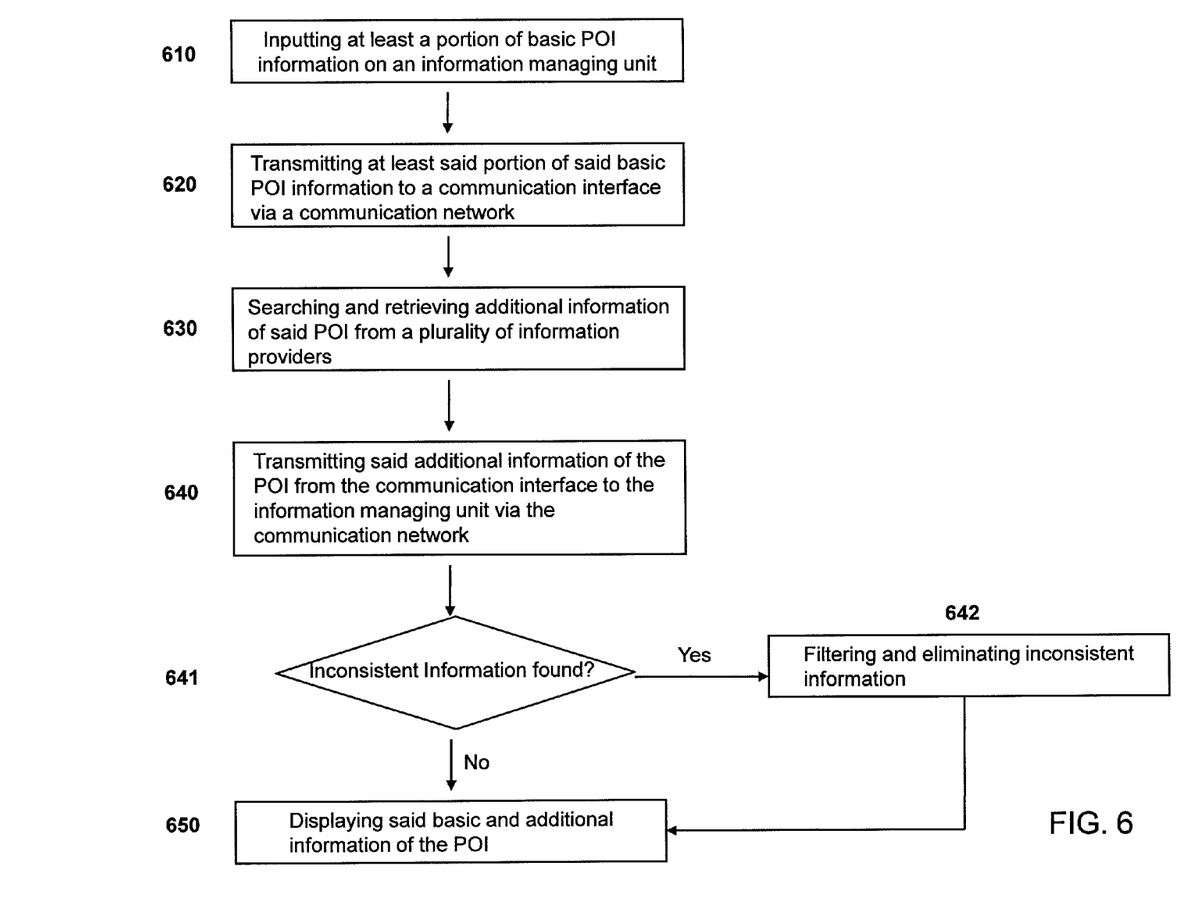
FIG. 6 depicts a method for searching for additional POI information and filtering additional POI information retrieved from different information providers if inconsistent information exists.

A program for conducting the operation of processing the additional POI information in the present invention shown in the flow charts of FIG. 6 is stored in the ROM 4109 or other memory and is executed by the CPU 4115. The CPU 4115 controls an overall operation of the information communication and delivery system in the present invention.

In an exemplary embodiment according to FIG. 4*b*, the user may input at least a portion of the basic POI information, for example, a restaurant name 411, through the information inputting unit 4102 and the input device interface 4103, and information managing unit 410 is configured to search the data storage 4117 and the Map/POI information memory 4106 to retrieve more basic POI information, such as address 412, phone number 413, etc. The basic POI information 411, 412, 413 and an additional restaurant information search request (not shown) are then transmitted to the communication interface 430 via the communication network 420. In some embodiments, the communication interface 430 may be the Internet 432, such that the additional restaurant information can be retrieved by searching a plurality of website databases, such as Google, Yahoo, Yelp, Zagat, etc. Some social networking websites such as Facebook, My Space, etc., can also be searched to obtain information about the user's preference and recommendations from the user's friends. The additional restaurant information such as ratings 414, recommended dishes 415, parking/traffic information 416, etc., can be transmitted wirelessly back to the information managing unit 410 through the communication network 420, and such additional information can be displayed on the user interface 4101 to help the user make an intelligent decision before actually going to the restaurant.

In other embodiments, the additional restaurant information may include information of other similar restaurants 417, in which the information processing unit 4104 may consider the information of the user's current location retrieved from the position and distance measuring device 4105 and provide the information of other similar restaurants 417 which are within a predetermined distance from the user's current location.

In another exemplary embodiment according to FIG. 4*c*, the user may want to know about information of a sports event, for example, tonight's Lakers basketball game from the information managing unit 410. The user may simply input a team name 411' into the information managing unit 410, and as described above, the team name 411' may be transmitted to the Internet 432 to search for additional sport event information, and such information will be transmitted back to the information managing unit 410. The additional sport event information may include future events 412', ticket availability 413', and parking/traffic information 414'. The additional information may also include a short movie of the team's star player 415'.

Since the additional POI information is retrieved from different information providers, at least a portion of such information may be inconsistent, and if the inconsistent information happens to be critical for the user to make the decision to go to the POI, the user can be more confused than without such additional information. In another embodiment of the present invention, the information managing unit 410 can further process the additional POI information received from the communication interface 430. In other words, the information processing unit 4104 is configured to filter and organize the additional POI information before presenting to the user if inconsistent information exists.

Figure 4D:
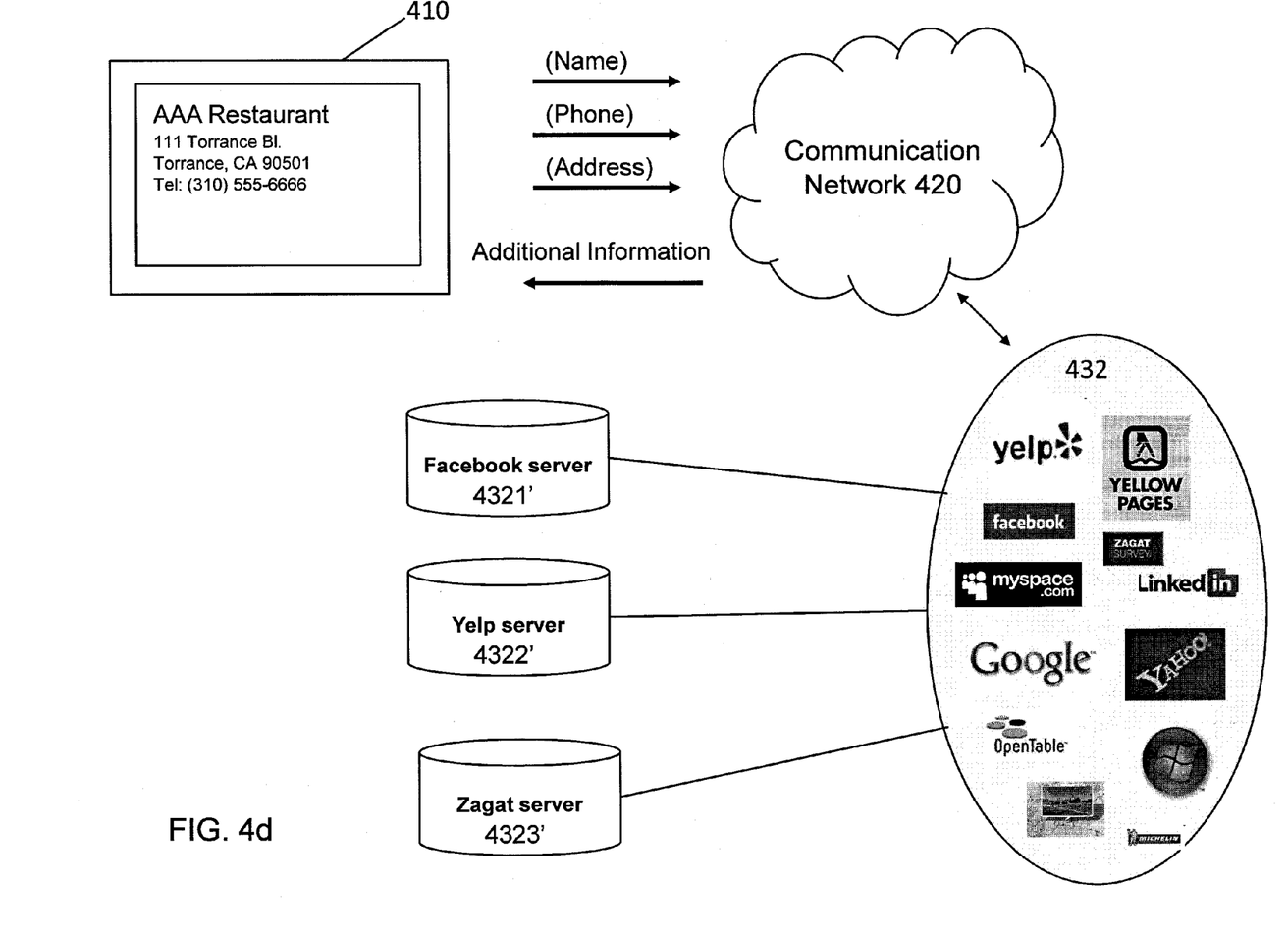
FIGS. 4d to 4f illustrate another embodiment in the present invention in which the information managing unit is configured to filter and eliminate inconsistent POI information retrieved from different information providers, and display filtered and organized POI information on a user interface.
Figure 4E:
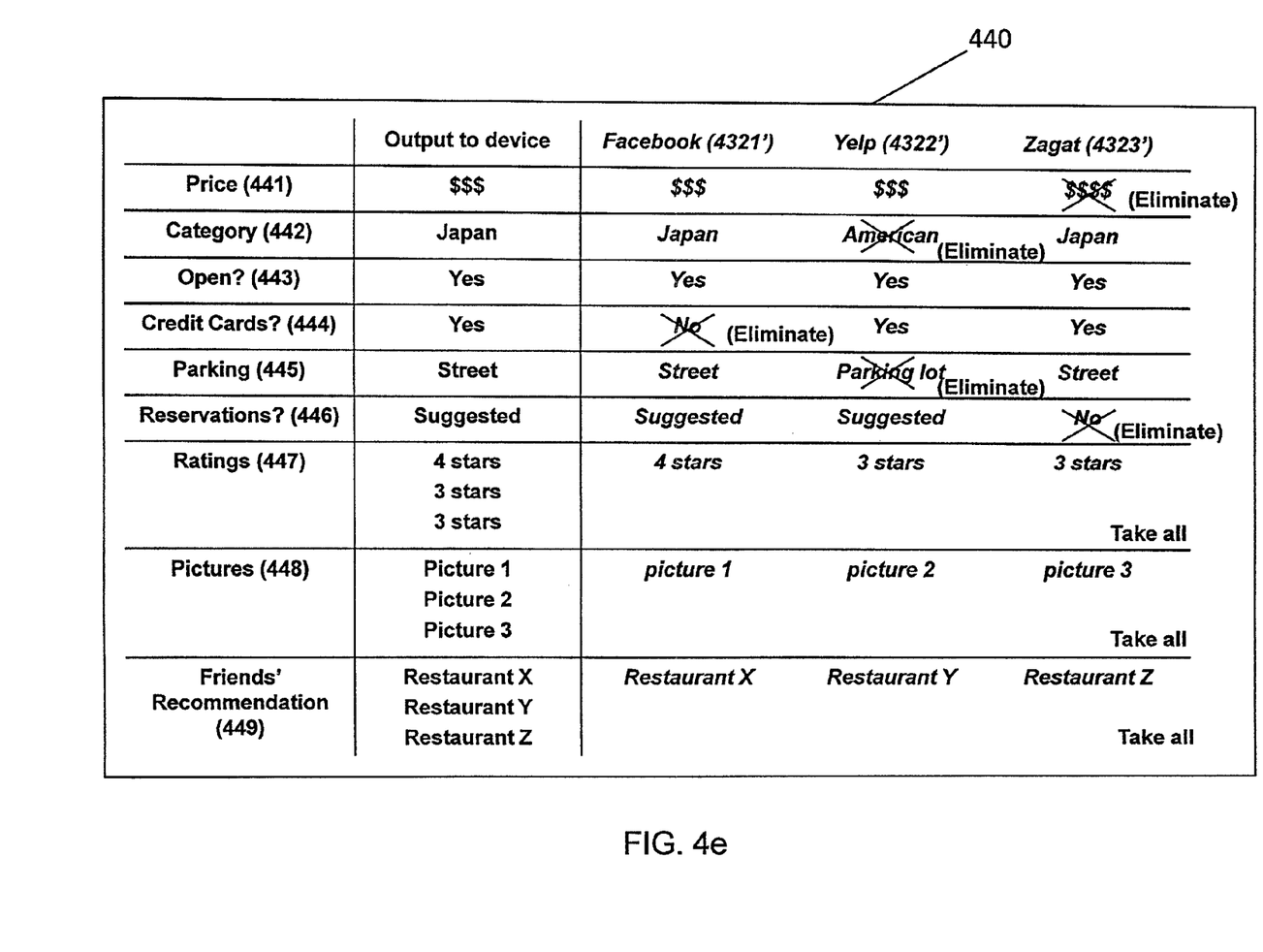

Referring to FIGS. 4*d* and 4*e*, the information managing unit 410 transmits at least a portion of the basic restaurant information (restaurant name, address, phone number) to the Internet 432 via the communication network 420. In one embodiment, at least three information providers (Facebook server 4321', Yelp server 4322' and Zagat server 4323') are connecting to the Internet 432 and streaming additional restaurant information 440 thereto. Since the additional restaurant information 440 is retrieved from three different information providers, at least a portion of the additional information 440 may be inconsistent and such inconsistent information may have to be further processed before presenting to the user.

As can be seen in FIG. 4*e*, inconsistent information includes price 441, category 442, credit card acceptance 444, parking information 445 and reservation 446. In one embodiment, the information processing unit 4104 is adapted to eliminate or filter information provided by at least one information provider which is inconsistent with the same information provided by a majority of information providers. For example, the information processing unit 4104 may eliminate the price information 441 provided by the Zagat server 4323' because such information is inconsistent with the price information 441 provided by the Facebook server 4321' and the Yelp server 4322'. The information processing unit 4104 may conduct an identical elimination process with respect to all inconsistent information, including category 442, credit card acceptance 444, parking information 445 and reservation 446. However, the information processing unit 4104 may keep some inconsistent information such as rating 447, restaurant pictures 448 and friends' recommendation (of other restaurants) 449 since such inconsistent information may not be mutually exclusive.

Figure 4F:
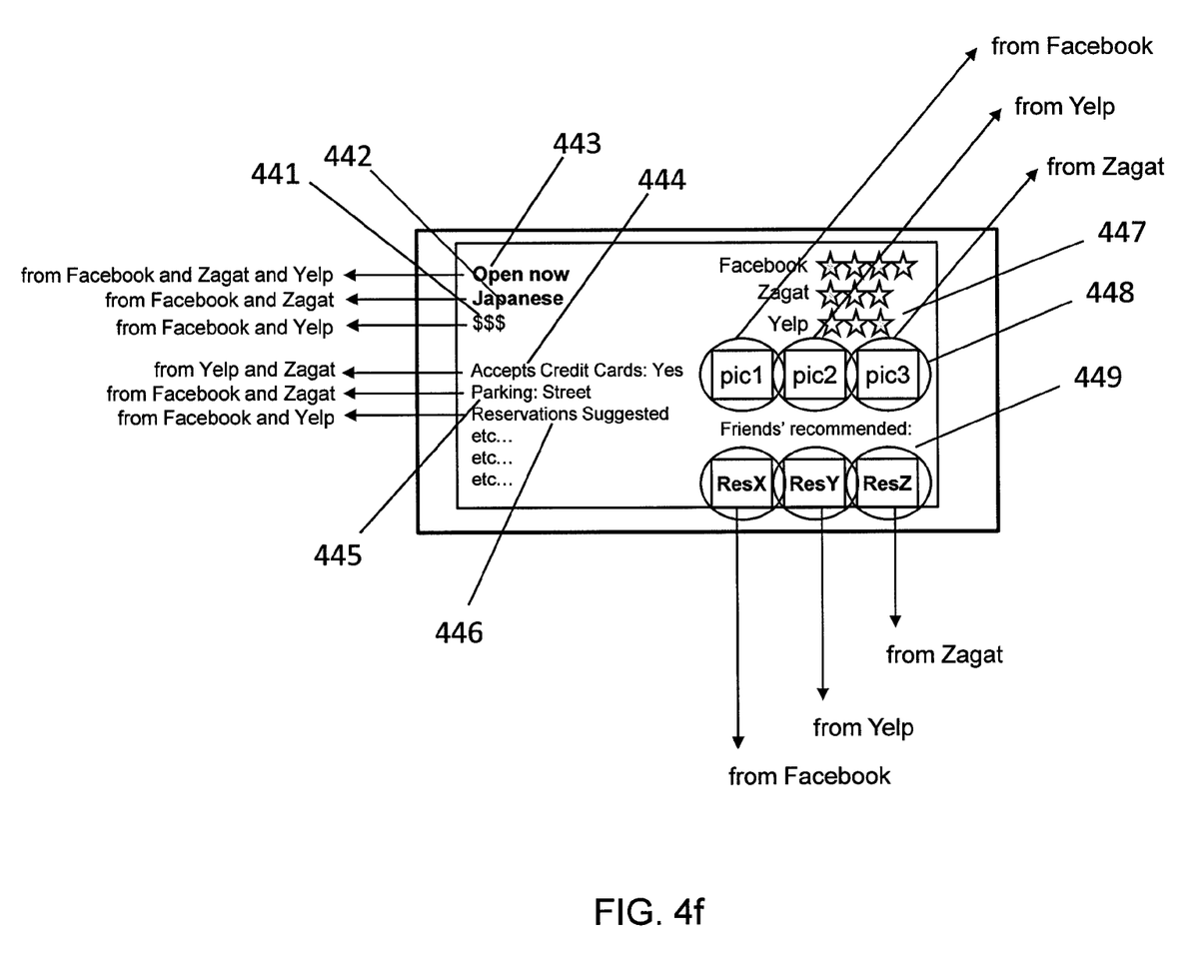

The additional restaurant information 440 which has been filtered and organized by the information processing unit 4104 is shown in FIG. 4*f*, where all information 441 to 449 illustrated in FIG. 4*e* is shown on the user interface 4101. In one embodiment, the user is allowed to customize the additional information displayed on the user interface 4101.

Figure 5:
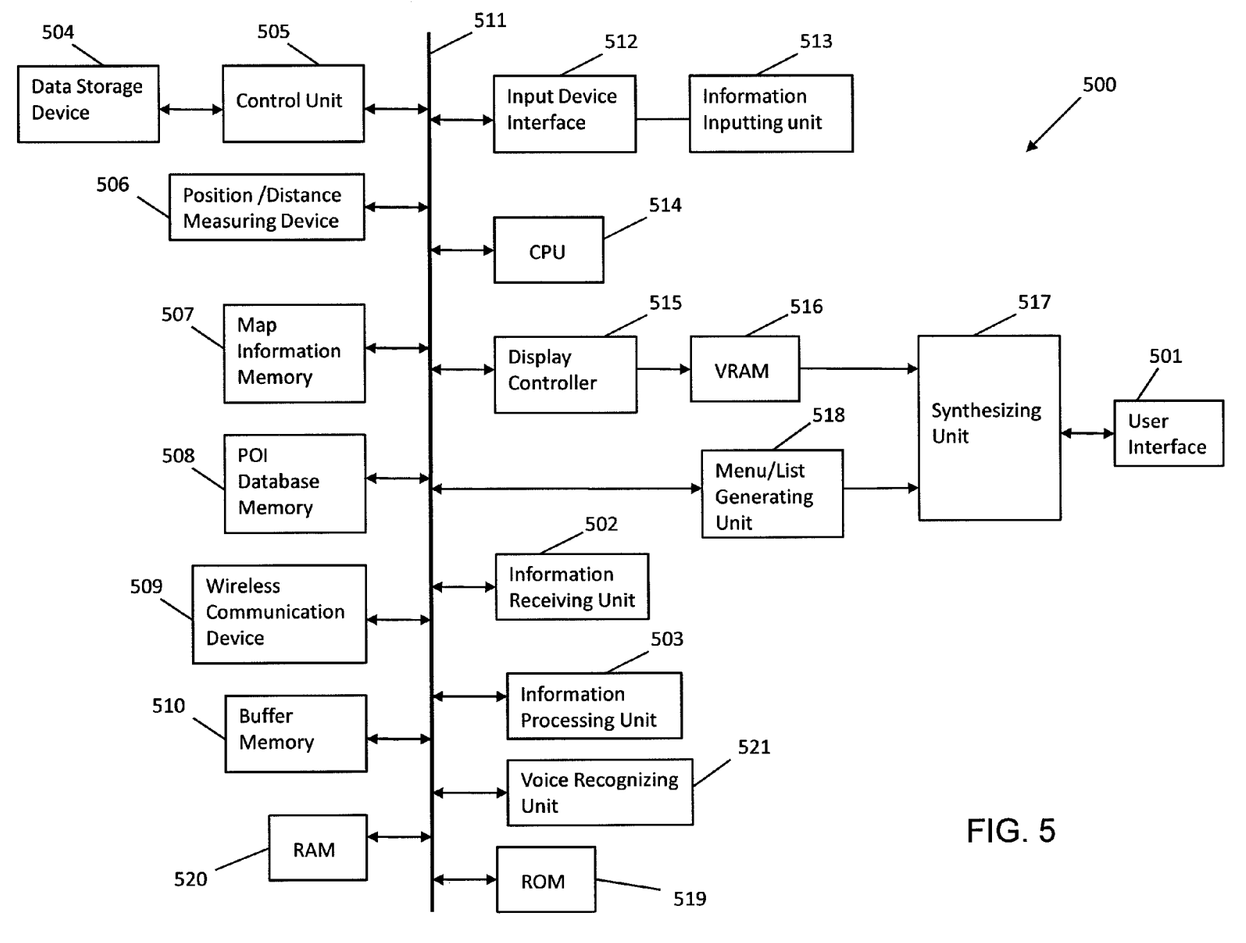
FIG. 5 illustrates a functional block diagram showing an example of structure of a navigation system in the present invention to provide filtered and organized POI information to the user.

FIG. 5 is a block diagram showing an example of structure of a navigation system 500 for implementing the present invention in another aspect. The navigation system 500 includes a user interface 501, an information receiving unit 502 adapted to receive additional POI information retrieved from the communication interface 430, an information processing unit 503 adapted to filter and organize the additional POI information before presented to the user. In one embodiment, the user interface 501 is a display unit which is configured to display maps, POIs and routing information. In another embodiment, the information receiving unit 502 is communicatively coupled with a wireless communication device 509 to receive the additional POI information retrieved by the communication interface 430.

The system also includes a data storage device 504 such as a hard disc, CD-ROM, DVD, a flash memory device or other storage means for storing the map data; a control unit 505 for controlling an operation for reading the information from the data storage device 504; and a position and distance measuring device 506 for measuring the present vehicle position or user position. For example, the position and distance measuring device 506 has a GPS (global positioning system) receiver for receiving GPS signals from satellites, a speed sensor for detecting a moving distance, a gyroscope for detecting a moving direction, and a microprocessor for calculating the user's current position using abovementioned information. In one embodiment, the information processing unit 503 is communicatively coupled with the position and distance measuring device 506 to determine the distance between the user's current position and the location of POIs, and the POI(s) which is within a predetermined distance from the user may be recommended to the user. In another embodiment, the navigation system 500 may be portable.

The block diagram of FIG. 5 further includes a map information memory 507 for storing the map information which is read from data storage 504, a database memory 508 for storing database information such a point of interest (POI) information which is read out from the data storage device 504, an input device 513 for executing a menu selection operation, an enlarge/reduce operation, a destination input operation, . . . etc. and an input device interface 512. In one embodiment, the input device 513 is a remote controller. In another embodiment, the navigation system 500 may include a voice recognizing unit 521 which is communicatively coupled with the input device interface 512 and programmed to recognize the user's spoken command, such that the basic POI information can be inputted by the user's voice.

Still referring to FIG. 5, the navigation system 500 includes a bus 511 for interfacing the above units in the system, a processor (CPU) 514 for controlling an overall operation of the navigation system 500, a ROM 519 for storing various control programs such as a route search program and a map matching program necessary for navigation control, a RAM 520 for storing a processing result such as a guide route and an event notification, a display controller 515 for generating map image (a map guide image and an arrow guide image) on the basis of the map information, a VRAM 516 for storing images generated by the display controller 515, a menu/list generating unit 518 for generating menu image/various list images, a synthesizing unit 517, a wireless communication device 509 to retrieve data from the remote server 431, the Internet 432 or other communication interfaces 433, and a buffer memory 510 for temporary storing data for ease of data processing.

In an exemplary embodiment, the user may input at least a portion of the basic POI information, for example, a restaurant name 411, through the information inputting unit 513 and the input device interface 512, and navigation system 500 is configured to search the data storage 504 and the POI database memory 508 and map information memory 507 to retrieve more basic POI information, such as address 412, phone number 413, etc. The basic POI information 411, 412, 413 and an additional restaurant information search request are then transmitted to the communication interface 430 via the communication network 420. In some embodiments, the communication interface 430 may be the Internet 432, such that the additional restaurant information can be retrieved by searching a plurality of website databases, such as Google, Yahoo, Yelp, Zagat, etc. Some social networking websites such as Facebook, My Space, etc., can also be searched to obtain information about the user's preference and recommendations from the user's friends. The additional restaurant information such as ratings 414, recommended dishes 415, parking/traffic information 416, etc., can be transmitted wirelessly back to the navigation system 500 through the communication network 420, and such additional information can be displayed on the user interface 501 to the user to help the user make an intelligent decision before actually going to the restaurant.

In another exemplary embodiment, if at least a portion of the additional information retrieved from different information providers is inconsistent, the information processing unit 503 can conduct the identical filtering and eliminating process with respect to some inconsistent information as illustrated in FIG. 4e.

According to another aspect in the present invention illustrated in FIG. 6, a method of searching for POI information comprises the steps of: inputting at least a portion of basic POI information on an information managing unit, the basic POI information includes a POI name, a POI address and a POI phone number 610; transmitting at least the portion of the basic POI information to a communication interface via a communication network 620; searching and retrieving additional information of the POI from a plurality of information providers 630; transmitting the additional information of the POI from the communication interface to the information managing unit via the communication network 640; and displaying the basic and additional information of the POI 650.

In some embodiments, the step of inputting at least a POI name on an information managing unit to retrieve a portion of information of the POI 610 includes a step of inputting the POI name through the information inputting unit 4102 (or 513) and the input device interface 4103 (or 512). The step of transmitting the portion of information of the POI to a communication interface via a communication network 620 includes a step of wirelessly transmitting the portion of information of the POI to the communication network.

As mentioned in step 630, since the additional information of the POI is retrieved from a plurality of information providers, at least a portion of the additional information may be inconsistent with other information and the information processing unit 4104 is configured to filter and organize the additional restaurant information 440 before presenting to the user. In one embodiment referring to FIG. 6, if there is no inconsistent information found in step 641, the additional POI information will be displayed to the user in the step 650. However, if there is inconsistent information found in step 641, the additional information will be filtered and eliminated in step 642 and then displayed on the user interface 4101 (or 501). The step of filtering and eliminating inconsistent information 642 may include a step of filtering and eliminating at least a portion of the additional information provided by at least one information provider if the portion of the additional information is inconsistent with the same portion of the additional information provided by a majority of the information providers.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A method of searching for Point-of-Interest (POI) information, comprising:

inputting at least a portion of basic POI information on an information managing unit, said basic POI information includes a POI name, a POI address and a POI phone number;

transmitting at least said portion of said basic POI information to a communication interface via a communication network;

searching and retrieving additional information of said POI from a plurality of website databases on a plurality of information providers via the communication interface;

transmitting said additional information of the POI from the communication interface to the information managing unit via the communication network; and displaying said basic and additional information of the POI;

wherein the step of displaying said additional information of the POI comprises a step of processing said additional information provided by each information provider, and wherein the step of processing said additional information includes a step of eliminating at least a portion of said additional information provided by at least one information provider if said portion of said additional information is inconsistent with the same portion of the additional information provided by a majority of the information providers.

2. The method of claim 1, wherein the step of displaying said additional information includes a step of displaying information of other relevant POIs which are within a predetermined distance from a user's current location.

3. The method of claim 2, wherein the step of displaying information of other relevant POIs includes a step of customizing said additional information according to the user's preference.

4. The method of claim 3, wherein the step of customizing said additional information according to the user's preference further includes a step of retrieving the user's preference either from the information managing unit or from an external database.

5. An apparatus for searching POI information comprises:
a user interface;
a database to store basic POI information;
a wireless communication device adapted to wirelessly communicate with a communication interface; and
an information processing unit,
wherein at least a portion of the basic POI information is transmitted through the wireless communication device to the communication interface which is configured to search and retrieve additional POI information according to said portion of the basic POI information, and said additional POI information is transmitted from a plurality of website databases on a plurality of information providers via said communication interface to the information processing unit which is adapted to filter and organize said additional POI information before being displayed on the user interface; and
wherein the information processing unit processes said additional POI information provided by each information provider, and
wherein the information processing unit compares the additional POI information provided by each information provider and eliminates at least a portion of said additional POI information provided by at least one information provider if said portion of additional POI information is inconsistent with the same portion of the additional POI information provided by a majority of the information providers.

6. The apparatus of claim 5 further comprises a position and distance measuring device adapted to determine a user's current position, wherein the information processing unit is configured to provide information of other relevant POIs which are within a predetermined distance of the user's current location.

7. The apparatus of claim 5, wherein the user is allowed to customize the additional POI information to be displayed on the user interface according to the user's preference which is obtained from the apparatus or an external database.

8. The apparatus of claim 5 further comprises an information inputting device which is communicatively coupled with a voice recognizing unit adapted to receive, recognize the user's spoken command, and allow the user to input at least a portion of the basic POI information by voice.

9. A navigation system comprises:

a user interface, at least one database to store and provide maps, road networks, geographical features, and basic point-of-interest (POI) information, said basic POI information includes a POI name, a POI address and a POI phone number;

an information inputting device which allows a user to input at least a portion of said basic POI information;

a wireless communication device adapted to wirelessly communicate with a communication interface; and an information processing unit, wherein at least a portion of the basic POI information is transmitted through the wireless communication device to the communication interface which is configured to search and retrieve additional POI information according to said portion of the basic POI information, and said additional POI information is transmitted from a plurality of website databases on a plurality of information providers via said communication interface to the information processing unit which is adapted to filter and organize said additional POI information before being displayed on the user interface; and wherein the information processing unit processes said additional POI information provided by each information provider, and wherein the information processing unit compares the additional POI information provided by each information provider and eliminates at least a portion of said additional POI information provided by at least one information provider if said portion of additional POI information is inconsistent with the same portion of the additional POI information provided by a majority of the information providers.

10. The navigation system of claim 9 further comprises a position and distance measuring device adapted to determine a user's current position, wherein the information processing unit is configured to provide information of other relevant POIs which are within a predetermined distance of the user's current location.

11. The navigation system of claim 9, wherein the user is allowed to customize the additional POI information to be displayed on the user interface according to the user's preference which is obtained from the apparatus or an external database.

12. The navigation system of claim 9 further comprises a voice recognizing unit which is adapted to receive and recognize the user's spoken command, wherein the voice recognizing unit is communicatively coupled with the information inputting device to allow the user to input at least a portion of the basic POI information by voice.

13. The method of claim 1, wherein said additional information includes friends' recommendation information.

\* \* \* \* \*